April 21, 1931.  A. A. HEIN ET AL  1,802,253
RAT TRAP
Filed June 3, 1929   2 Sheets-Sheet 1
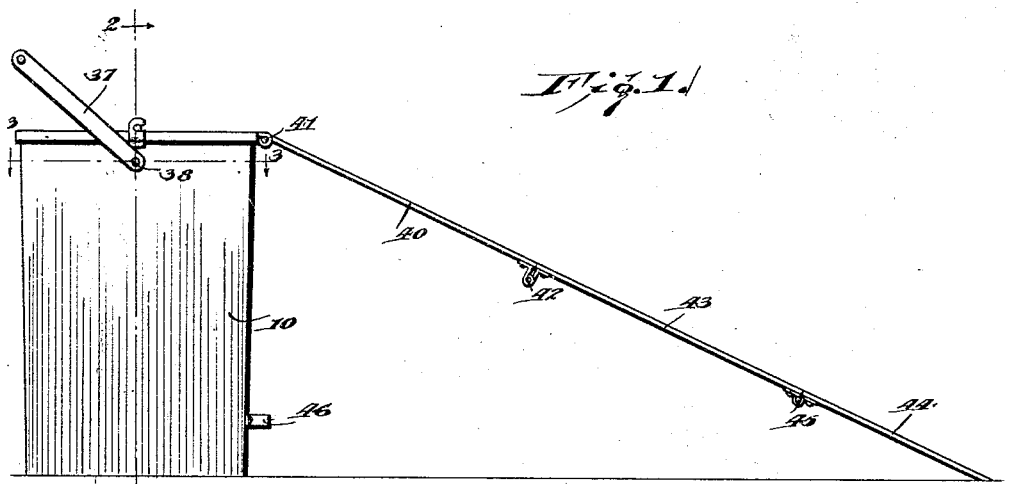
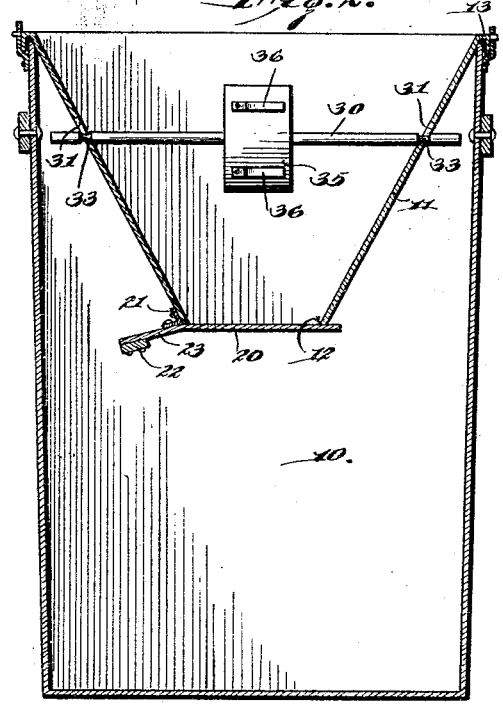
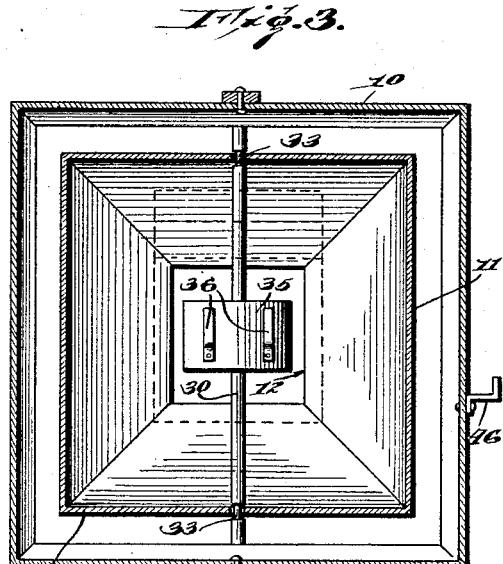
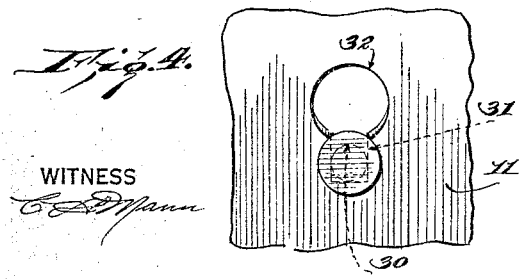
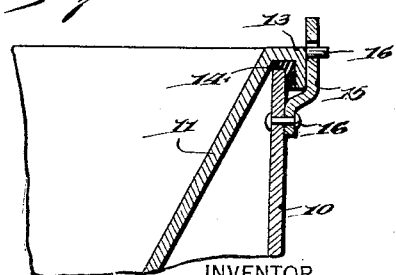
INVENTOR
A. A. Hein and
H. H. Smith,
BY
ATTORNEY April 21, 1931.  A. A. HEIN ET AL  1,802,253
RAT TRAP
Filed June 3, 1929   2 Sheets-Sheet 2
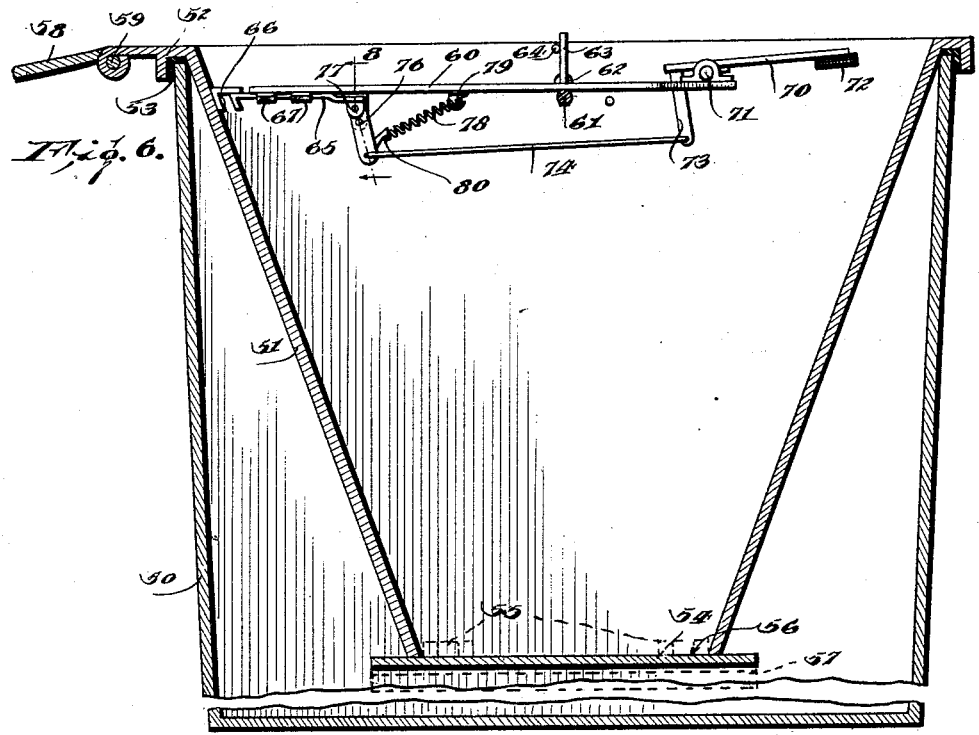
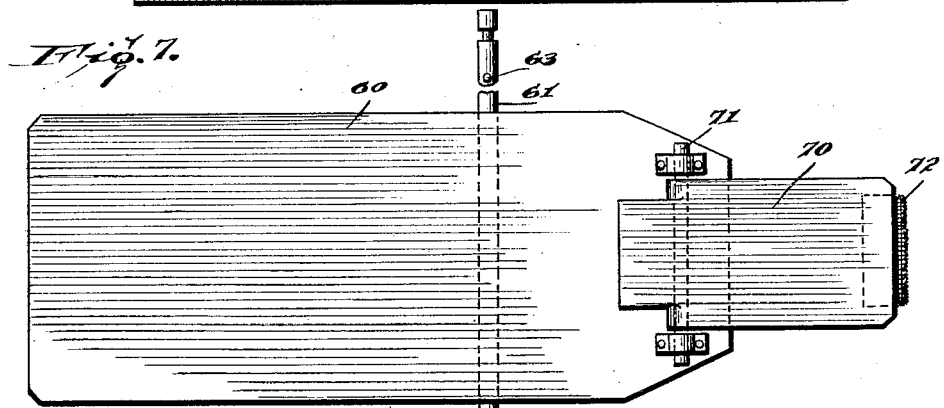
WITNESS
INVENTOR
A. A. Hein and
H. T. Smith,
BY
ATTORNEY Patented Apr. 21, 1931

1,802,253

UNITED STATES PATENT OFFICE

ADOLPH A. HEIN, OF BOTHELL, AND HERBERT F. SMITH, OF SEATTLE, WASHINGTON

RAT TRAP

Application filed June 3, 1929. Serial No. 368,066.

This invention relates to rat traps.

An object of the invention is the provision of a device adapted to be placed adjacent the habitation of rats or mice and includes a retainer for imprisoning the animals after they have been projected through an opening to the container by means of a trap door or movable element on which the animals fail to maintain a foothold.

A further object of the invention is the provision of a trap which includes a receptacle having a conically-shaped mouth through which the rats are projected when they attempt to obtain the bait placed upon a movable element which is adapted to rapidly project the animals through an opening in the conically-shaped member, a foldable platform being associated with the container for directing the rats to the movable element.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claim.

In the drawings:

Figure 1 is a side view of one form of the trap,

Figure 2 is a transverse vertical section taken along the line 2—2 of Figure 1,

Figure 3 is a horizontal section taken along the line 3—3 of Figure 1,

Figure 4 is a fragmentary elevation showing the bearings on a rock shaft,

Figure 5 is a fragmentary vertical section showing the mechanism for securing an entrance member to the container, Figure 6 is a foreshortened vertical section of a modified form of the device, Figure 7 is a detached plan view of the dumping mechanism, and Figure 8 is a vertical section taken along the line 8—8 of Figure 6.

Referring more particularly to the drawings, 10 designates a container into which the rats or mice are adapted to be projected. This container may be of any configuration in cross section.

A frusto-conically-shaped member 11 has its reduced open end 12 disposed within the container while the upper end has an L-shaped flange 13 shown more particularly in Figure 5 which embraces the upper edge of the container 10 and a packing strip 14 is disposed between the flange and the upper edge of the container 10. Latches 15, pivoted at 16 on the container, are adapted to engage the pin 16 secured to the flange 13. The latch provides a means for rigidly connecting the frusto-conically-shaped member 11 to the container 10.

A trap door 20 is hinged at 21 to one edge of the member 11 adjacent the reduced opening 12. A weight 22 secured to an extension 23 of the door 20 maintains the door closed.

The shaft 30 is mounted in bearings 31 formed in oppositely disposed walls of the frusto-conically-shaped member 11. The bearings are in the form of key-hole slots and have a wide portion 32 through which the shaft is inserted after which the reduced portion 33 of the shaft is moved within the key-slot 31. By this construction it will be seen that the shaft 30 may be moved through the enlarged circular portion 32 of the key slot until the reduced portions 33 have been placed over the key slot 31. By lowering the shaft the reduced portions of the shaft will fall into the key slot and be supported thereby.

A cylinder 35 is secured to the shaft 30 and is provided with circumferentially spaced spring clips 36 under which the bait is adapted to be inserted for attracting rats or mice.

A handle 37 is hingedly connected at 38 with the container 10 so that the device may be readily transported.

A runway is connected with the container 10 by the hinging of a section 40 of the runway at 41 on one edge of the container. A hinge 42 connects sections 40 with sections 43 and the leaves of said hinge are of sufficient length to permit the folding of section 44 on the section 43 with both sections being moved into close association with the sections 40.

The sections 43 and 44 are hingedly connected together at 45. A keeper 46 pivotally connected to one face of the container is adapted to engage the outer face of the section 40 when the sections are folded upon themselves and in close contact with one face of the container 10.

The operation of our device is as follows: The container 10 is placed in the vicinity of the habitation of the rodents by the platform need not necessarily be located in the direct path of travel of the rodents.

The cylinder 35 is baited by placing the food under the clips 36 where the rats or mice will readily see the same. The odors from the bait will tend to attract the rodents which will find a direct path to the top of the container by means of the sections of the platform. When the rodent attempts to obtain the bait from the cylinder 35 the cylinder will revolve and project the rodent onto the readily movable platform 20 and thence into the container 10 where they will be collected. It will be noted that there are no parts in the frusto-conically-shaped entrance member 11 which will offer any resistance to the passage of the rats into the container. At times the retainer will be emptied to remove the rats entrapped therein.

Referring more particularly to the modified forms shown in Figs. 6 to 8, inclusive, it will be seen that a somewhat similar construction is provided and in which a container 50 has its upper open end provided with a frusto-conically-shaped member 51 depending into the container and supported by a U-shaped flange 52 resting on the upper edge of the container. A packing 53 is located between the upper edge of the container and the flange 52. Latches are employed for retaining the member 51 in place on the container. A trap door 54 is hingedly connected, at 55, to the bottom of the frusto-conically-shaped member 51 adjacent the opening 56. A weight 57 maintains the door closed.

A runway 58 is hingedly connected, at 59, to a projection of the flange 52 and is similar in all respects to the runway shown in Figure 1.

The plate 60 is hingedly mounted on a rock bar 61 supported in bearings 62 formed in the side walls of the member 51. A lug 63 rigidly connected with the rock bar 61 and engaging a pin 64 on the member 51 maintains the plate 60 in a horizontal position since the left hand portion of the plate being heavier will tend to move downwardly particularly when a rodent steps on that portion of the plate. A catch 65 is slidably mounted in bearings 67 formed on the underface of the plate 60.

A platform 70 is pivotally mounted at 71 on the outer end of the plate 60 and is provided with a bait cage 72 at its free end. A bar 73 is rigid with the underface of the platform 70 and projects through an opening in the plate 60. A link 74 connects the member 73 with a lever 75 pivoted at 76 on the underface of the plate 60. The upper end of the lever 75 is connected by means of a pin 77 to the outer end of the catch 65. A spring 78 has one end connected at 79 to the underface of the plate 60 while the other end is connected to a lug 80 projecting from the lower end of the lever 75.

The operation of the device shown in Figs. 6 to 8 is as follows: When a rodent reaches the upper end of the runway 58 it will move along the plate 60 toward the bait cage 72 until it will have moved to the outer free end of the platform 70. At this time the free end of the platform will tilt downwardly forcing the link 74 rearwardly in the direction indicated by the arrow and thereby actuating the lever 75 and releasing the catch 65 from the lug 66. At this time the plate 60 and the platform 70 will tilt rapidly and project the rodent into the member 51 whence it will fall upon the trap door 54. The weight of a mouse or rat will be sufficient to overcome the weight 57 from whence the rodent will be discharged into the bottom of the container 50 where it will be imprisoned.

It will be seen by the constructions described above that the bait in no case will be disturbed and may be used a number of times before it need be replenished since at no time does a rat or mouse come in contact with the bait.

We claim:—

An animal trap comprising a container having an upper open end, a runway connected with the upper open end of the container, a plate rockably mounted on the container across the open end, means for rockably mounting the plate intermediate the ends thereof, a keeper carried by the upper end of the container, a latch slidably mounted on the bottom of the plate and engageable with the keeper, a lever pivotally mounted on the bottom of said plate and adjacent one end thereof and having connection with the latch so that when the lever is rocked the latch will be moved out of engagement with the keeper, a spring for maintaining the lever in a predetermined position and the latch engaged with the keeper, a platform pivotally mounted on the other end of the plate, a lever rigid with and projecting from the platform downwardly through the plate, a link connecting the first-mentioned lever with the second-mentioned lever, and a bait holder connected to the outer free end of the platform.

ADOLPH A. HEIN.
HERBERT F. SMITH.